US009819818B1

(12) United States Patent
    Morita

(10) Patent No.: US 9,819,818 B1
(45) Date of Patent: Nov. 14, 2017

(54) IMAGE READING DEVICE AND IMAGE FORMING APPARATUS INCLUDING SAME

(71) Applicant: KYOCERA Document Solutions Inc., Osaka (JP)

(72) Inventor: Takuro Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/495,322

(22) Filed: Apr. 24, 2017

(30) Foreign Application Priority Data

Apr. 27, 2016 (JP) .................................. 2016-089644

(51) Int. Cl.
    *H04N 1/04* (2006.01)
    *H04N 1/00* (2006.01)
    *H04N 1/192* (2006.01)

(52) U.S. Cl.
    CPC ..... *H04N 1/00559* (2013.01); *H04N 1/00557* (2013.01); *H04N 1/192* (2013.01); *H04N 2201/0081* (2013.01); *H04N 2201/0082* (2013.01); *H04N 2201/0093* (2013.01)

(58) Field of Classification Search
    CPC ............... H04N 1/00559; H04N 1/192; H04N 1/00557; H04N 2201/0081
    USPC .................................................. 358/483, 474
    See application file for complete search history.

(56) References Cited

U.S. PATENT DOCUMENTS

2015/0116787 A1* 4/2015 Kim ......................... G02B 7/00
                                                    358/406
2015/0264207 A1* 9/2015 Kitaichi ............. H04N 1/00798
                                                    358/434

FOREIGN PATENT DOCUMENTS

JP         2009-278182 A    11/2009

* cited by examiner

*Primary Examiner* — Houshang Safaipour
(74) *Attorney, Agent, or Firm* — Stein IP, LLC

(57) ABSTRACT

An image reading device according to the present disclosure includes a support plate, a CCD sensor, an insulating member, a CCD mounting board and an elastic member. The CCD sensor is arranged on one surface of the support plate. The insulating member is arranged on the other surface of the support plate. The elastic member fixes the CCD mounting board to the support plate. The elastic member includes: a main body portion; a first arm and a second arm which are bent with respect to the main body portion and which have a first engagement portion and a second engagement portion that are engaged with the edges of the support plate; and a protrusion portion which is provided in the main body portion and which presses the CCD mounting board toward the support plate. The tip end portion of the first arm is bent at an acute angle.

7 Claims, 5 Drawing Sheets

IMAGE READING DEVICE AND IMAGE FORMING APPARATUS INCLUDING SAME

This application is based upon and claims the benefit of priority from the corresponding Japanese Patent Application No. 2016-089644 filed on Apr. 27, 2016, the entire contents of which are incorporated herein by reference.

BACKGROUND

The present disclosure relates to image reading devices such as a digital copying machine, a facsimile machine and an image scanner and an image forming apparatus which includes such an image reading device.

In general, in an image reading device, such as a copying machine or an image scanner, which optically reads an original document, light that is obtained by an illumination lamp and that is reflected off the original document is focused with an image forming lens to form an image on a CCD (Charge Coupled Device) sensor, the optical image of the CCD sensor is converted into electrical signals and thus the original document is read.

An image reading device is known in which a CCD mounting board is arranged by sandwiching a CCD sensor at one side of a support plate and sandwiching an insulating member at the opposite side, in which the leads of the CCD sensor are inserted into the CCD mounting board, in which an elastic member having a pair of arms holding the edge of the support plate is engaged with the support plate from behind (the side opposite to the insulating member) the CCD mounting board, in which the CCD mounting board is pressed toward the support plate with a protrusion portion formed on the elastic member and in which thus the CCD mounting board is fixed to the support plate.

In the image reading device described above, the CCD mounting board is pressed toward the support plate with the elastic member, and thus the CCD mounting board is prevented from being warped in a direction away from the support plate. In this way, in the CCD sensor fitted to the CCD mounting board, the image formation position of a lens is prevented from being displaced.

SUMMARY

An image reading device according to one aspect of the present disclosure includes a support plate, a CCD sensor, an insulating member, a CCD mounting board and an elastic member. The CCD sensor is arranged on one surface of the support plate. The insulating member is arranged on the other surface of the support plate. The CCD mounting board is arranged on the side of the insulating member opposite to the support plate. The elastic member holds the edge of the support plate from the side of the CCD mounting board opposite to the insulating member and fixes the CCD mounting board to the support plate. A through hole is formed in each of the support plate and the insulating member, and the CCD sensor includes a plurality of leads which are inserted into the CCD mounting board through the through holes of the support plate and the insulating member. The elastic member includes: a main body portion which is arranged on the side of the CCD mounting board opposite to the insulating member; a first arm and a second arm which are formed by bending the end edges of the main body portion opposite each other substantially vertically and which have, at tip end portions, a first engagement portion and a second engagement portion that are engaged with the edges of the support plate; and a protrusion portion which is provided between the first arm and the second arm in the main body portion and which presses the CCD mounting board toward the support plate. At least the first engagement portion is bent at an acute angle with respect to the first arm.

Further other objects of the present disclosure and specific advantages obtained by the present disclosure will become more apparent from the description of embodiments given below.

DETAILED DESCRIPTION

Embodiments of the present disclosure will be described below with reference to drawings.

First Embodiment

Figure 1:
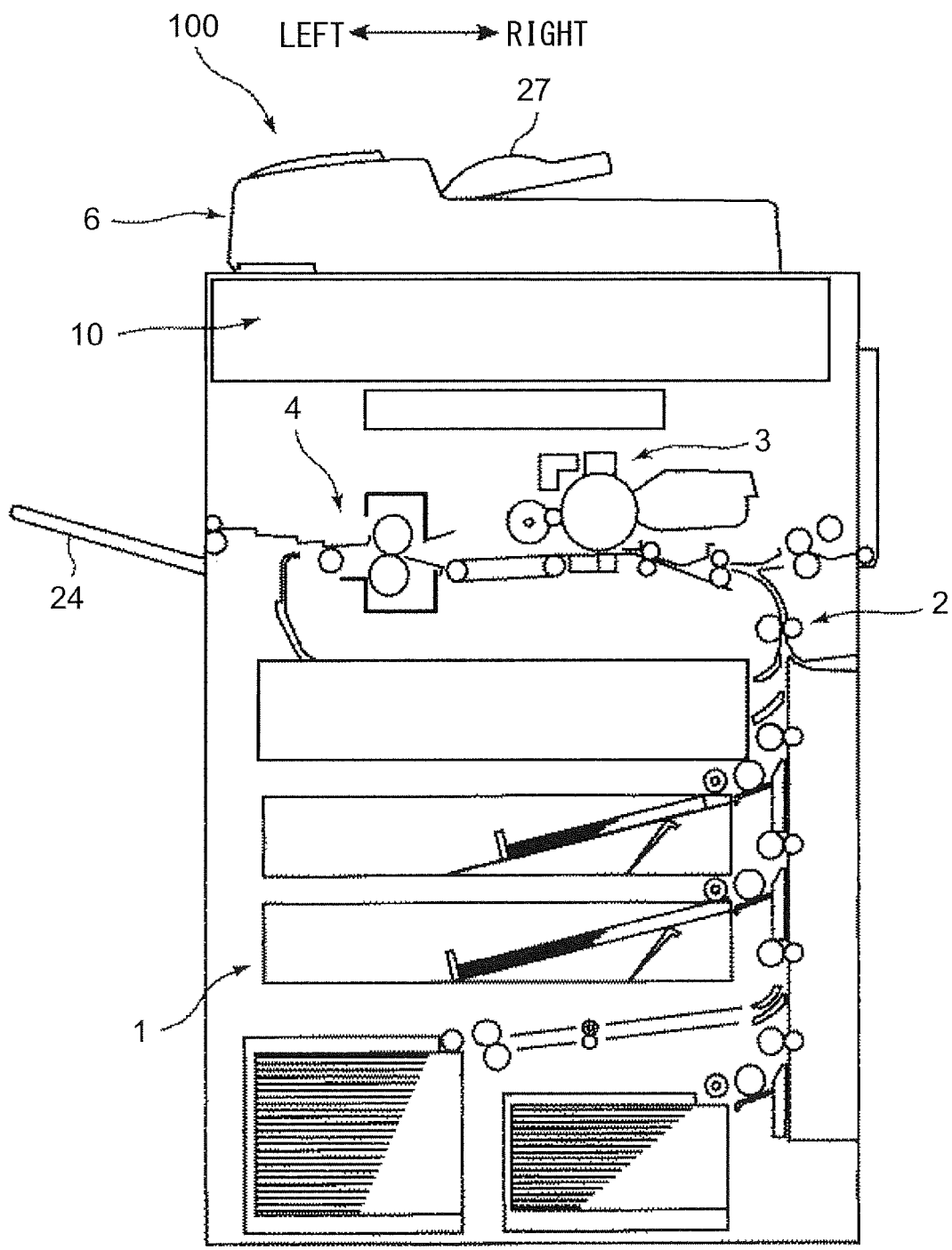
FIG. 1 is a schematic view showing the configuration of an image forming apparatus which includes an image reading portion (image reading device) according to a first embodiment of the present disclosure.

FIG. 1 is a schematic view showing the configuration of an image forming apparatus 100 which includes an image reading portion 10 according to a first embodiment of the present disclosure. The image forming apparatus 100 includes a paper feed portion 1 which is arranged in a lower portion of the apparatus main body, a sheet transport portion 2 which is arranged on the right side of and above the paper feed portion 1, an image formation portion 3 which is arranged above the sheet transport portion 2, a fixing portion 4 which is arranged on the downstream side in a sheet transport direction with respect to the image formation portion 3, an image reading portion (image reading device) 10 which is arranged above the image formation portion 3 and the fixing portion 4 and an original document feed portion 6 which is arranged above the image reading portion 10.

The sheet transport portion 2 transports a sheet fed from the paper feed portion 1 toward the image formation portion 3 and further ejects the sheet on which an image is formed in an area from the image formation portion 3 to the fixing portion 4 onto an ejection tray 24.

The image formation portion 3 forms a predetermined toner image on the sheet based on the image data of the original document read with the image reading portion 10 by an electrophotographic process. The fixing portion 4 fixes the toner image to the sheet to which the toner image is transferred in the image formation portion 3.

The original document feed portion 6 performs so-called sheet through-type original document reading so as to respond to, for example, an input of an instruction to start copying to automatically transport original documents placed on an original document tray 27 one by one and to eject the original document onto an original document ejection tray (unillustrated) after the exposure scanning of the original document.

The image reading portion 10 applies light to the original document which is fed by the original document feed portion 6 or the original document which is placed on contact glass, converts the reflected light into electrical signals and thereby reads the image information of the original document to produce image data corresponding to the image of the original document.

Figure 2:
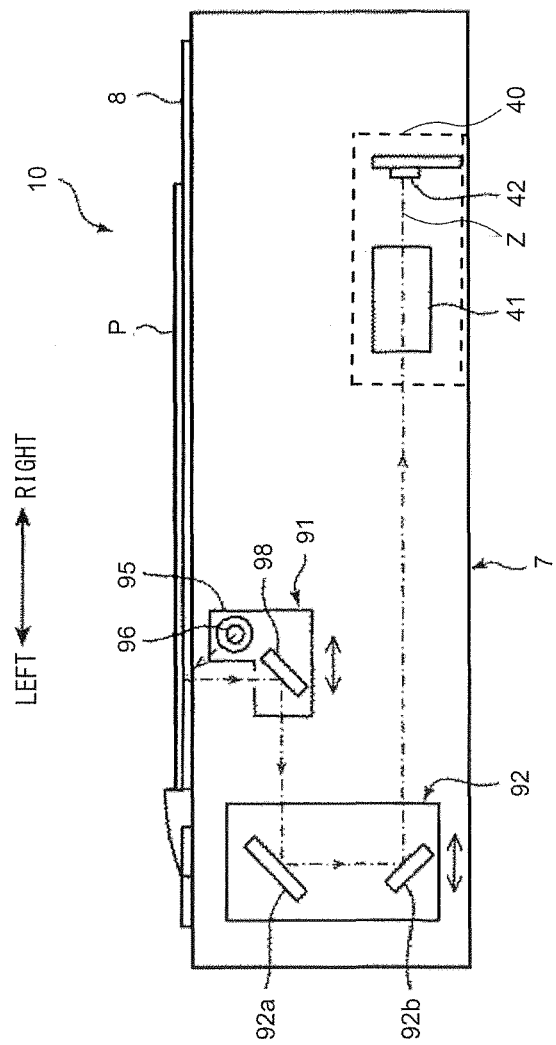
FIG. 2 is a cross-sectional view showing the structure of the image reading portion according to the first embodiment of the present disclosure.

FIG. 2 is a cross-sectional view showing the structure of the image reading portion 10 according to the first embodiment of the present disclosure. The image reading portion 10 includes the contact glass 8 on which the original document P is placed and a scanner portion 7 which reads the image information of the original document P so as to produce image data from the image of the read original document P.

The scanner portion 7 is formed with a first movement carriage 91 which is arranged in an upper portion of the scanner portion 7, a second movement carriage 92 which is arranged on the left side of the first movement carriage 91, an image sensing unit 40 which is arranged in an appropriate lower portion of the scanner portion 7 and the like.

The first movement carriage 91 and the second movement carriage 92 are connected to a scanning mechanism portion (unillustrated), the scanning mechanism portion is moved at a predetermined speed in a sub-scanning direction (the left/right direction of FIG. 2) and thus the entire surface of the original document P placed on the contact glass 8 is scanned, with the result that it is possible to read the image information of the entire surface of the original document.

The first movement carriage 91 includes a frame member 95 which is connected to the scanning mechanism portion, a light source 96 such as an exposure lamp which applies light to the original document P placed on the contact glass 8 and a reflection mirror 98 which reflects the light from the contact glass 8 toward the second movement carriage 92. The second movement carriage 92 includes a pair of reflection mirrors 92a and 92b which are arranged opposite each other in an up/down direction, and the light from the reflection mirror 98 in the first movement carriage 91 is sequentially reflected off the reflection mirrors 92a and 92b and is guided to the image sensing unit 40.

The image sensing unit 40 includes an image forming lens 41 and a CCD sensor 42 which is arranged on the right side of the image forming lens 41.

The image forming lens 41 includes a plurality of lenses in order to focus the reflected light from the original document P which enters through the reflection mirror 92b of the second movement carriage 92 and to form an image, and is fixed in a predetermined position of the image sensing unit 40.

The CCD sensor 42 includes a plurality of image sensing elements which are arranged as pixels in a longitudinal direction (in FIG. 2, a direction of the depth of the plane thereof) on the optical axis Z of the image forming lens 41, and converts, into electrical signals, the optical image of the original document P formed on the image sensing elements with the image forming lens 41.

In the image reading portion 10 configured as described above, the light is applied to the contact glass 8 by the light source 96, the reflected light from the original document P on the contact glass 8 is reflected off the reflection mirror 98 in the first movement carriage 91, the reflected light is sequentially reflected off the reflection mirrors 92a and 92b in the second movement carriage 92 and the optical image of the original document P is formed through the image forming lens 41 on the CCD sensor 42. In this way, part of the original document P is read. Then, the first movement carriage 91 and the second movement carriage 92 are moved at a predetermined speed, and thus the entire surface of the original document P is scanned and is thereby read, with the result that the read image is formed.

Figure 3:
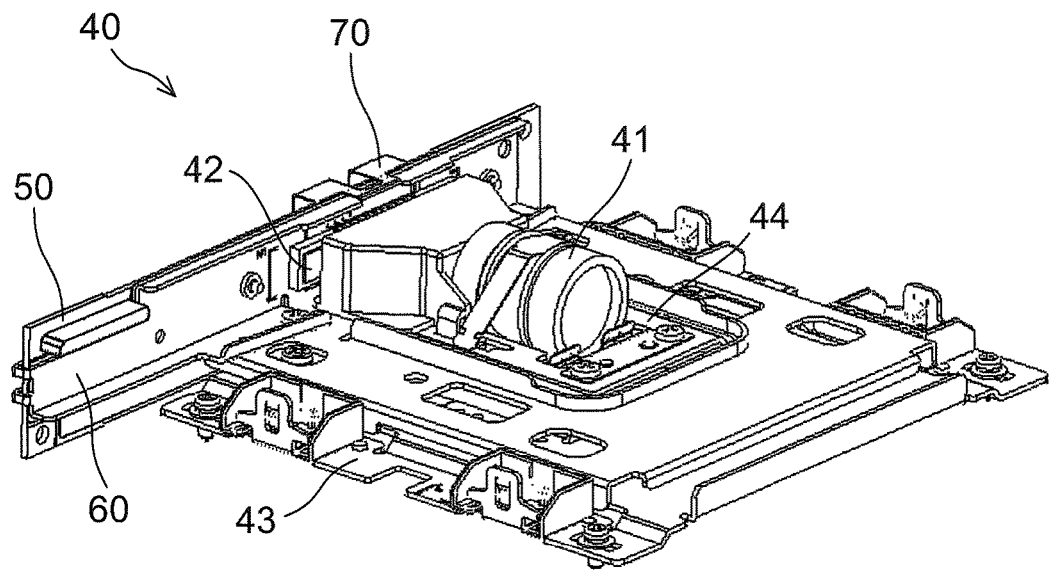
FIG. 3 is a perspective view showing the structure of an image sensing unit in the image reading portion according to the first embodiment of the present disclosure.
Figure 4:
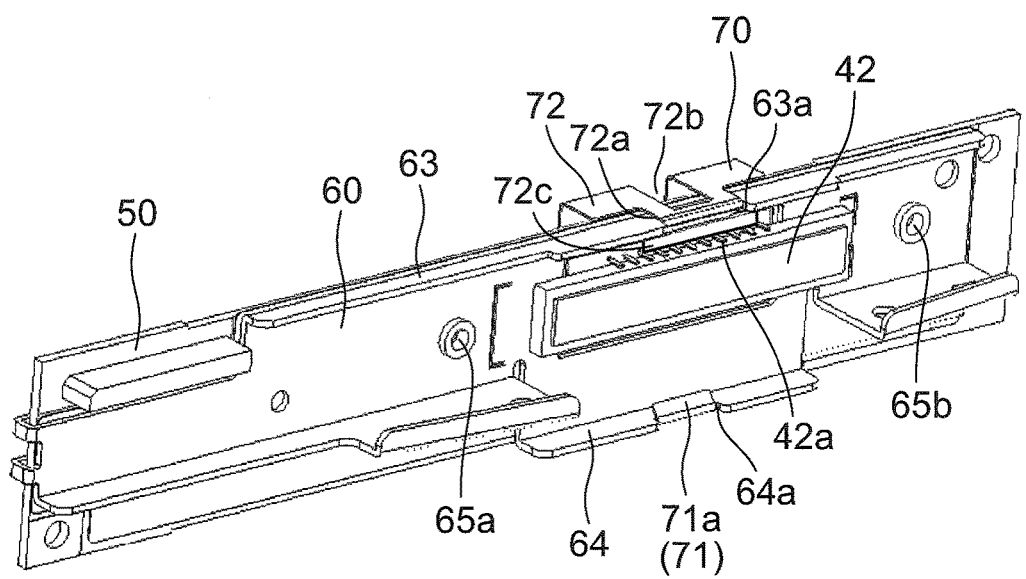
FIG. 4 is a perspective view showing a state where a CCD mounting board is fixed to a support plate of the image sensing unit in the image reading portion according to the first embodiment of the present disclosure.
Figure 5:
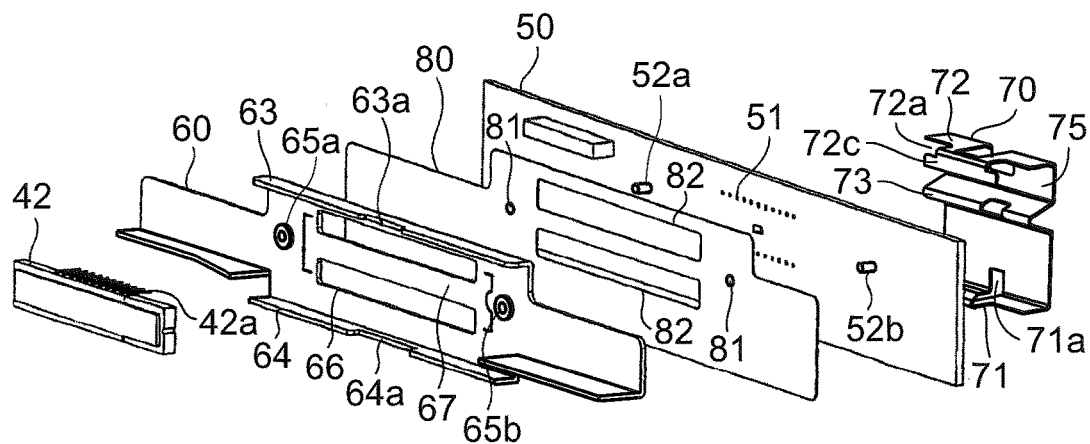
FIG. 5 is an exploded perspective view showing the constituent elements of part of the image sensing unit in the image reading portion according to the first embodiment of the present disclosure.
Figure 6:
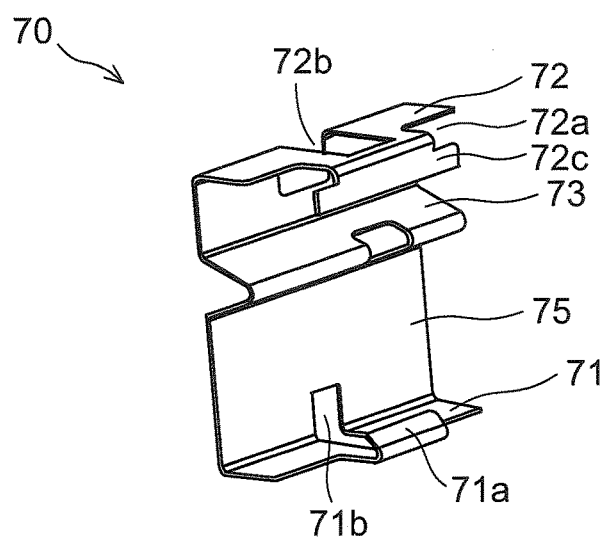
FIG. 6 is a perspective view showing the structure of an elastic member of the image sensing unit in the image reading portion according to the first embodiment of the present disclosure.

The image sensing unit 40 will then be described in detail with reference to FIGS. 3 to 6. FIG. 3 is a perspective view showing the structure of the image sensing unit 40 in the image reading portion 10 according to the first embodiment of the present disclosure, and FIG. 4 is a perspective view showing a state where a CCD mounting board 50 is fixed to a support plate 60 of the image sensing unit 40 in the image reading portion 10 according to the first embodiment of the present disclosure. FIG. 5 is an exploded perspective view showing the constituent elements of part of the image sensing unit 40 in the image reading portion 10 according to the first embodiment of the present disclosure, and FIG. 6 is a perspective view showing the structure of an elastic member 70 of the image sensing unit 40 in the image reading portion 10 according to the first embodiment of the present disclosure.

As shown in FIG. 3, the image sensing unit 40 includes the image forming lens 41 which focuses the reflected light from the original document P to form an image, a lens mount 44 which fixes and holds the image forming lens 41, the CCD sensor 42 which is provided so as to face the emission side of the image forming lens 41, the CCD mounting board 50 to which the CCD sensor 42 is fitted, the support plate 60 which fixes and holds the CCD mounting board 50 with the elastic member 70 and a chassis 43 which holds the lens mount 44 such that the position of the lens mount 44 can be adjusted, which holds the support plate 60 with a suspension mechanism and a traction mechanism and which is made of sheet metal.

As shown in FIGS. 4 and 5, the support plate 60 is obtained by press-forming sheet metal, is horizontally long, is formed substantially in the shape of a rectangle and is supported vertically with respect to the chassis 43 (see FIG. 3). On the upper and lower ends of the support plate 60, bent edges 63 and 64 are respectively formed. In the centers of the bent edges 63 and 64, cutouts 63a and 64a with which the elastic member 70 is engaged are formed. As shown in FIG. 4, the upper end (the upper surface of the bent edge 63) of the support plate 60 is arranged so as to be higher than the upper end of the CCD mounting board 50 or to be flush with the upper end, and the lower end (the lower surface of the bent edge 64) of the support plate 60 is arranged so as to be lower than the lower end of the CCD mounting board 50 or to be flash with the lower end.

Between the bent edges 63 and 64 of the support plate 60, a bridge portion 67 and a pair of through holes 66 on the upper and lower sides of the bridge portion 67 are arranged and formed. The bridge portion 67 is a receiving part with which the CCD mounting board 50 is brought into contact through an insulating member (insulator) 80 to be described later when the CCD mounting board 50 is pressed by the elastic member 70 toward the support plate 60. The pair of through holes 66 are formed in the shape of longitudinally long holes, and a plurality of leads 42a protruding from the upper and lower ends of the CCD sensor 42 are passed through the pair of through holes 66 toward the side of the CCD mounting board 50. In order for the leads 42a of the CCD sensor 42 to be passed, one large through hole is not provided in the support plate 60 but the two long holes are provided so as to be aligned vertically and parallel to each other, and thus it is possible to reduce the area of the through holes 66. Moreover, since the bridge portion 67 is present between the long holes, it is possible to reduce the lowering of the strength of the support plate 60.

Outside of the bridge portion 67 of the support plate 60 in the longitudinal direction, a pair of locating holes 65a and 65b are formed.

The CCD mounting board 50 is formed in the shape of a horizontally long rectangle, is formed of a plate-shaped resin material and is arranged so as to sandwich the support plate 60 together with the CCD sensor 42. On the surface of the CCD mounting board 50, a circuit pattern formed with copper foil is provided and the CCD sensor 42 is also mounted. In the CCD mounting board 50, equal numbers of the leads 42a and through holes 51 into which the leads 42a of the CCD sensor 42 are inserted are formed.

On the CCD mounting board 50, a locating pin 52a which is inserted into the locating hole 65a of the support plate 60 and a locating pin 52b which is inserted into the locating hole 65b are provided. The locating pins 52a and 52b may be fixed to the surface of the CCD mounting board 50 on the side of the support plate 60 or may be provided so as to be protruded to the side of the support plate 60 from the side of the CCD mounting board 50 opposite to the support plate 60 through the through hole.

The insulating member 80 is a sheet which is formed of an electrical insulating material such as a resin, is held by being sandwiched between the CCD mounting board 50 and the support plate 60 and is provided so as to prevent the circuit pattern on the surface of the CCD mounting board 50 from making contact with the support plate 60 made of sheet metal, with the result that a short circuit in the circuit is prevented. In the insulating member 80, two insertion holes 81 through which the locating pins 52a and 52b are passed and two through holes 82 through which the leads 42a of the CCD sensor 42 are passed are formed.

As shown in FIGS. 4 to 6, the elastic member 70 is formed by pressing a metal thin plate used as a plate spring, for example, a thin plate of spring steel or phosphor bronze such that its cross section is formed substantially in the shape of the number "3", and is arranged on the back surface side (the side opposite to the insulating member 80 and the CCD sensor 42) of the CCD mounting board 50. The elastic member 70 includes a main body portion 75 which is arranged on the back surface side of the CCD mounting board 50 and a first arm 71 and a second arm 72 which are bent substantially vertically with respect to the main body portion 75.

In the center portion (between the first arm 71 and the second arm 72) of the main body portion 75, a protrusion portion 73 is provided which presses the CCD mounting board 50 toward the support plate 60. The protrusion portion 73 is formed by bending the main body portion 75 such that its cross section is formed in the shape of a mountain, and is extended horizontally in a position corresponding to the bridge portion 67 of the support plate 60 when the elastic member 70 is attached to the support plate 60.

The first arm 71 and the second arm 72 are provided on the lower and upper ends of the main body portion 75, and are extended over the lower and upper edges of the CCD mounting board 50 and the insulating member 80 so as to be engaged with the bent edges 64 and 63 of the support plate 60.

The tip end portion of the first arm 71 is bent at an acute angle. The portion (first engagement portion 71a) of the first arm 71 which is bent at an acute angle functions as a guide for the CCD mounting board 50 and the support plate 60 when the elastic member 70 is engaged with the support plate 60 as will be described later. When the first engagement portion 71a is engaged with the cutout 64a of the bent edge 64, since the tip end portion of the first arm 71 sandwiches the bent edge 64, the engagement of the first arm 71 and the bent edge 64 is prevented from being disengaged.

In the tip end portion of the second arm 72, a constricted portion 72a is formed, and the tip end portion is bent substantially vertically. When the constricted portion 72a of the second arm 72 is engaged with the cutout 63a of the bent edge 63, since a portion (second engagement portion 72c) on the side of the tip end with respect to the constricted portion 72a is engaged with the bent edge 63, the engagement of the second arm 72 and the bent edge 63 is prevented from being disengaged.

Since the width of the first engagement portion 71a is formed so as to be substantially equal to the width of the cutout 64a of the bent edge 64, and the width of the constricted portion 72a of the second arm 72 is formed so as to be substantially equal to the width of the cutout 63a of the bent edge 63, the elastic member 70 is prevented from being displaced in the longitudinal direction after the first arm 71 and the second arm 72 are engaged with the bent edges 64 and 63.

In the elastic member 70, a first slit 71b is formed so as to straddle from the main body portion 75 to the first arm 71, and a second slit 72b is formed so as to straddle from the main body portion 75 to the second arm 72. The first slit 71b is formed so as to be extended to the vicinity (the portion of a narrow width) of the first engagement portion 71a, and the second slit 72b is formed as to be extended to the constricted portion 72a (the portion of a narrow width).

When the elastic member 70 is used to fix the CCD mounting board 50 to the support plate 60, the locating pins 52a and 52b of the CCD mounting board 50 are inserted through the pair of insertion holes 81 in the insulating member 80 and into the locating holes 65a and 65b in the support plate 60, and thus the insulating member 80 and the CCD mounting board 50 are overlaid on the support plate 60. Thereafter, the leads 42a of the CCD sensor 42 are passed through the through holes 66 in the support plate 60 and the through holes 82 in the insulating member 80, are inserted into the through holes 51 in the CCD mounting board 50 and are soldered.

Then, the elastic member 70 is arranged on the back surface side of the CCD mounting board 50, and the second arm 72 of the elastic member 70 is engaged with the cutout 63a of the bent edge 63 in the support plate 60. Thereafter, the first arm 71 is engaged with the cutout 64a of the bent edge 64 in the support plate 60. Here, the outer peripheral surface of the first engagement portion 71a in the first arm 71 functions as a guide, and thus the lower ends of the CCD mounting board 50 and the support plate 60 are moved along the guide surface (the first engagement portion 71a). When the first arm 71 and the second arm 72 are engaged with the bent edges 64 and 63 of the support plate 60, the protrusion portion 73 of the elastic member 70 presses the CCD mounting board 50 toward the support plate 60, in particular, presses the bridge portion 67, and thus the CCD mounting board 50 is fixed to the support plate 60 as shown in FIG. 4.

When the elastic member 70 is removed from the CCD mounting board 50 and the support plate 60, in a state where the first arm 71 is engaged with the cutout 64a of the bent edge 64, the second arm 72 is elastically deformed in a direction (upward direction) in which the second arm 72 is separated from the first arm 71, and is thereby removed from the cutout 63a of the bent edge 63. Thereafter, the first arm 71 is removed from the cutout 64a of the bent edge 64.

The material, the thickness, the size, the shape and the like of the elastic member 70 are appropriately designed, and thus the CCD mounting board 50 is strongly pressed onto the support plate 60, with the result that even when the CCD mounting board 50 attempts to be warped by a variation in temperature, it is possible to press the warping and thereby prevent the CCD mounting board 50 from being separated. In this way, the image formation position of the image forming lens 41 in the CCD sensor 42 is prevented from being displaced, and thus it is possible to prevent the degradation of the read image. Since the CCD sensor 42 and the CCD mounting board 50 are not moved relative to each other, the electrical connection of the leads 42a is prevented from being damaged.

In the present embodiment, as described above, the first engagement portion 71a of the elastic member 70 is bent at an acute angle with respect to the first arm 71. In this way, when the elastic member 70 is engaged with the support plate 60 from the side of the CCD mounting board 50 opposite to the insulating member 80, the first engagement portion 71a functions as the guide, and thus the CCD mounting board 50 and the support plate 60 are moved along the guide surface (the first engagement portion 71a). Hence, the elastic member 70 can easily be engaged with the support plate 60, and thus it is possible to enhance the assembly of the image reading portion 10.

As described above, in the elastic member 70, the first slit 71b is formed so as to straddle from the main body portion 75 to the first arm 71. In this way, the first arm 71 is more likely to be elastically deformed in a direction in which the first arm 71 is separated from the second arm 72, and thus it is possible to more enhance the assembly.

As described above, in the elastic member 70, the second slit 72b is formed so as to straddle from the main body portion 75 to the second arm 72. In this way, the second arm 72 is more likely to be elastically deformed in the direction in which the second arm 72 is separated from the first arm 71, and thus it is possible to easily remove the elastic member 70 from the support plate 60 and the CCD mounting board 50.

As described above, the lower end (the lower surface of the bent edge 64) of the support plate 60 is arranged so as to be lower than the lower end of the CCD mounting board 50 or to be flush with the lower end. In this way, since as compared with a case where the lower end of the support plate 60 is arranged so as to be higher than the lower end of the CCD mounting board 50, the first engagement portion 71a does not needs to be formed so as to be high, when the elastic member 70 is engaged with the support plate 60, the first arm 71 does not need to be significantly deformed in the direction (downward direction) in which the first arm 71 is separated from the second arm 72. Hence, it is possible to enhance the assembly as compared with the case where the lower end of the support plate 60 is arranged so as to be higher than the lower end of the CCD mounting board 50.

As described above, on the CCD mounting board 50, the locating pins 52a and 52b are provided, and in the support plate 60, the locating holes 65a and 65b into which the locating pins 52a and 52b are inserted are formed. In this way, the CCD mounting board 50 can be highly accurately located on the support plate 60.

Second Embodiment

Figure 7:
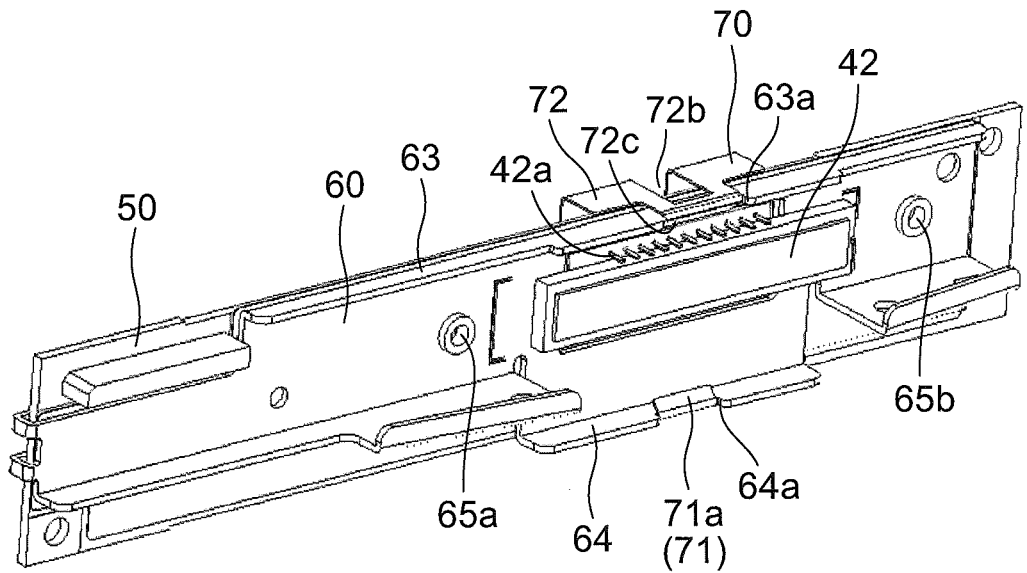
FIG. 7 is a perspective view showing a state where a CCD mounting board is fixed to a support plate of an image sensing unit in an image reading portion according to a second embodiment of the present disclosure.
Figure 8:
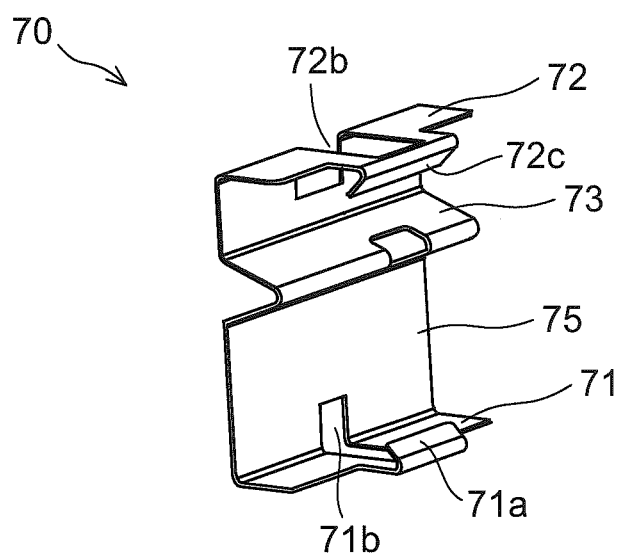
FIG. 8 is a perspective view showing the structure of an elastic member of the image sensing unit in the image reading portion according to the second embodiment of the present disclosure.

In a second embodiment of the present embodiment, as shown in FIGS. 7 and 8, the second arm 72 is formed in the same shape as the first arm 71. Specifically, the tip end portion of the second arm 72 is bent at an acute angle. The portion (the second engagement portion 72c) of the second arm 72 which is bent at an acute angle functions as the guide for the CCD mounting board 50 and the support plate 60 when the elastic member 70 is engaged with the support plate 60. When the tip end portion of the second arm 72 is engaged with the cutout 63a of the bent edge 63, the tip end portion of the second arm 72 sandwiches the bent edge 63, and thus the engagement of the second arm 72 and the bent edge 63 is prevented from being disengaged. The second slit 72b is formed so as to be extended to the vicinity (the portion of a narrow width) of the second engagement portion 72c.

The other structures in the second embodiment are the same as in the first embodiment.

In the present embodiment, as described above, the second engagement portion 72c is bent at an acute angle with respect to the second arm 72. In this way, the second engagement portion 72c also functions as the guide, and thus it is possible to more enhance the assembly of the image reading portion 10.

The other effects of the second embodiment are the same as in the first embodiment.

It should be considered that the embodiments disclosed herein are illustrative in all respects and not restrictive. The scope of the present disclosure is indicated not by the description of the embodiments discussed above but by the scope of claims, and meanings equivalent to the scope of claims and all modifications within the scope are further included.

For example, although the example where the present disclosure is applied to the copying machine is described, the present disclosure is not limited to this configuration, and the present disclosure can be applied to image reading devices such as a facsimile machine, a multifunctional machine and an image scanner and various image forming apparatuses which include them.

What is claimed is:
1. An image reading device comprising:
a support plate;
a CCD sensor which is arranged on one surface of the support plate;
an insulating member which is arranged on the other surface of the support plate;
a CCD mounting board which is arranged on a side of the insulating member opposite to the support plate; and
an elastic member which holds an edge of the support plate from a side of the CCD mounting board opposite to the insulating member and which fixes the CCD mounting board to the support plate,
wherein a through hole is formed in each of the support plate and the insulating member, the CCD sensor includes a plurality of leads which are inserted into the CCD mounting board through the through holes of the support plate and the insulating member, the elastic member includes: a main body portion which is arranged on the side of the CCD mounting board opposite to the insulating member; a first arm and a second arm which are formed by bending end edges of the main body portion opposite each other substantially vertically and which have, at tip end portions, a first engagement portion and a second engagement portion that are engaged with the edges of the support plate; and a protrusion portion which is provided between the first arm and the second arm in the main body portion and which presses the CCD mounting board toward the support plate and at least the first engagement portion is bent at an acute angle with respect to the first arm.

2. The image reading device according to claim 1, wherein in the elastic member, a first slit is formed so as to straddle from the main body portion to the first arm.

3. The image reading device according to claim 1, wherein the second engagement portion is bent at an acute angle with respect to the second arm.

4. The image reading device according to claim 1, wherein the second engagement portion is bent substantially vertically with respect to the second arm, and in the elastic member, a second slit is formed so as to straddle from the main body portion to the second arm.

5. The image reading device according to claim 1, wherein an end portion of the support plate on a side of the first arm is arranged so as to be on the side of the first arm with respect to an end portion of the CCD mounting board on the side of the first arm or to be flush with the end portion on the side of the first arm.

6. The image reading device according to claim 1, wherein on the CCD mounting board, a plurality of locating pins are provided, in the insulating member, a plurality of insertion holes through which the locating pins are inserted are formed and in the support plate, a plurality of locating holes into which the locating pins are inserted are formed.

7. An image forming apparatus comprising:
the image reading device according to claim 1.

* * * * *